April 27, 1954
A. S. JANIS
2,676,920
ROTARY SCUM SKIMMER
Filed May 4, 1950
2 Sheets-Sheet 1
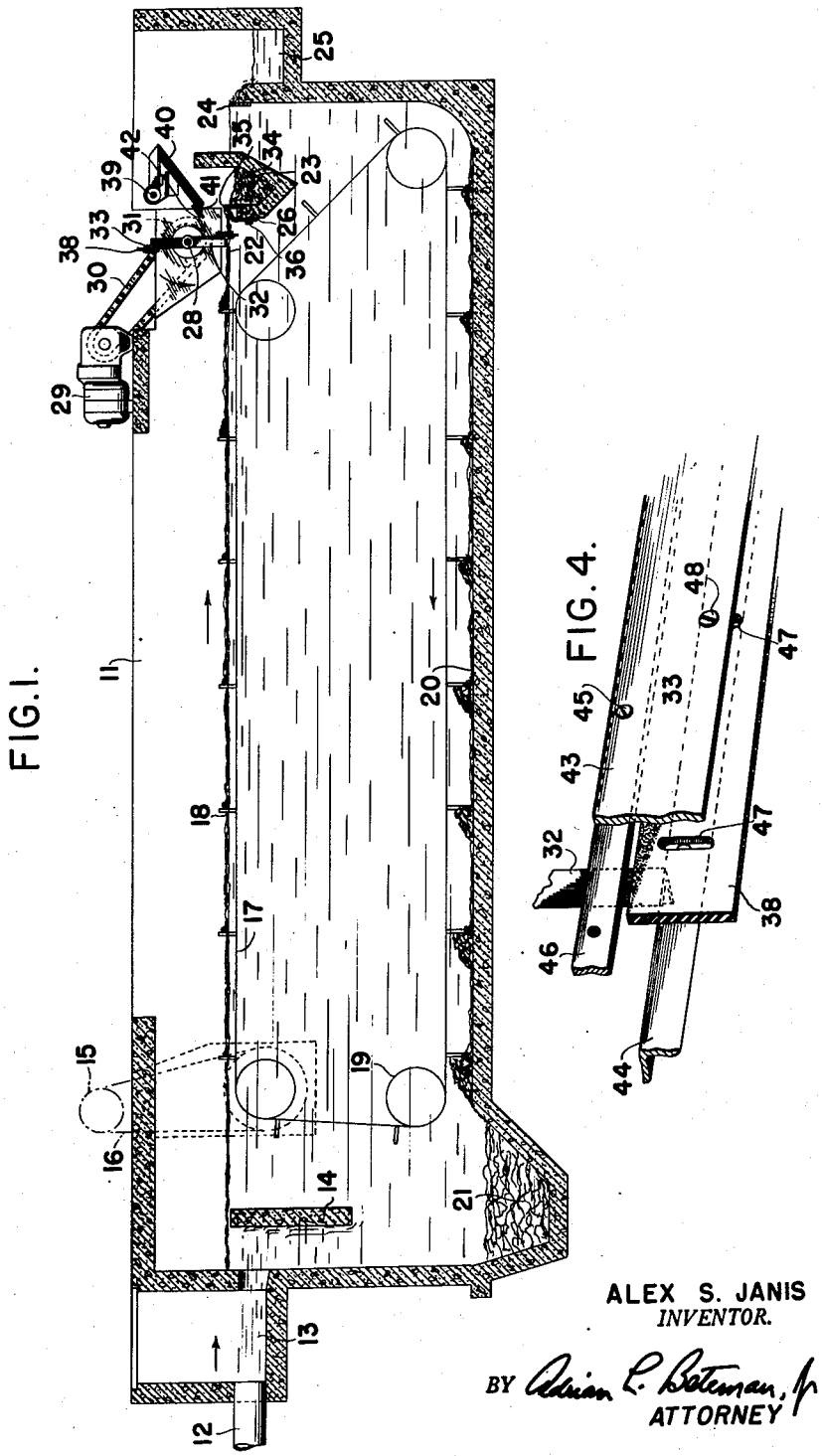
ALEX S. JANIS
INVENTOR.
BY Adrian L. Bateman, Jr.
ATTORNEY April 27, 1954
A. S. JANIS
2,676,920
ROTARY SCUM SKIMMER
Filed May 4, 1950
2 Sheets-Sheet 2
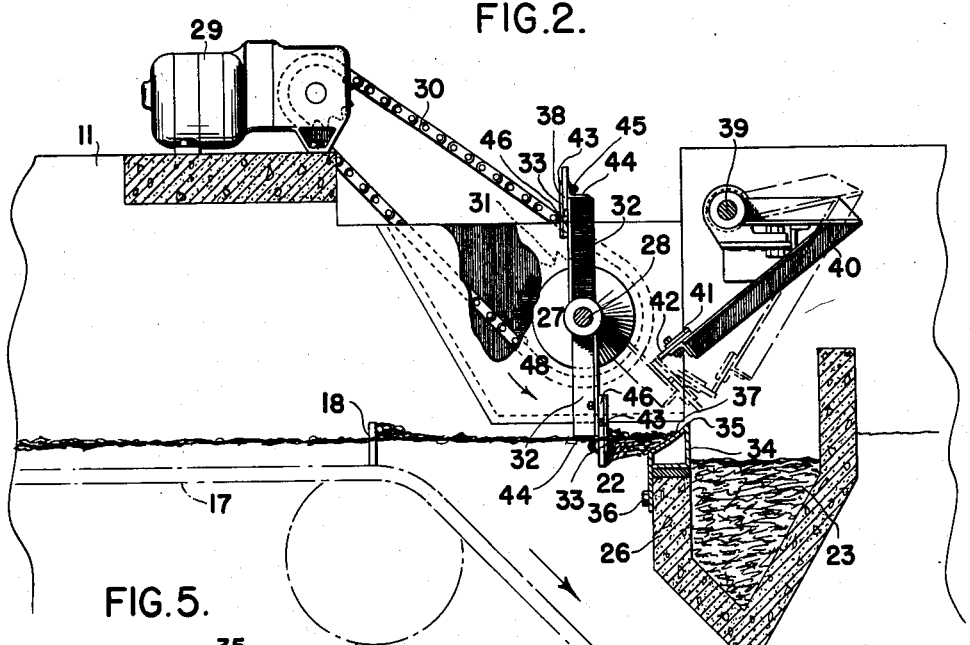
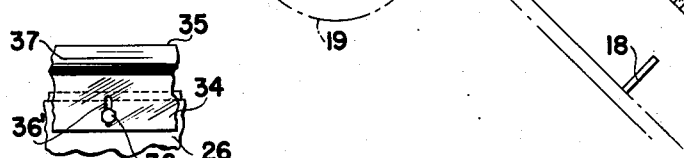
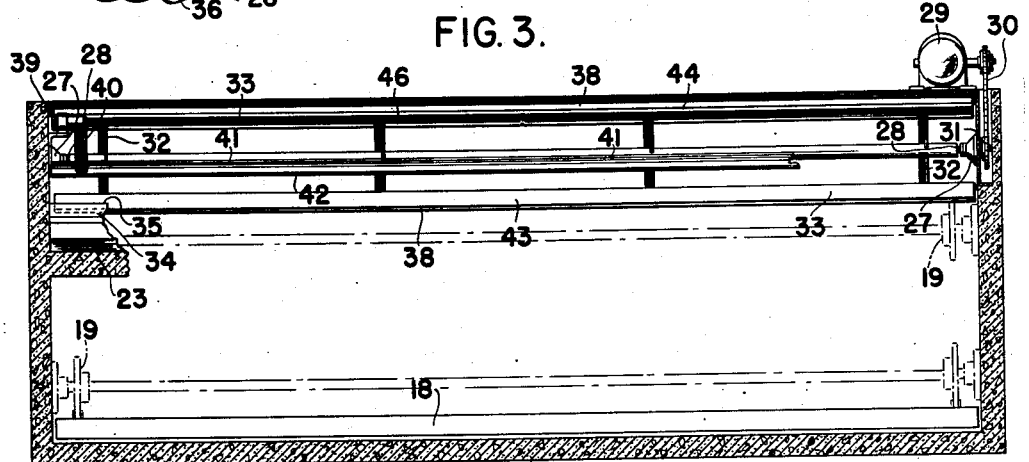
ALEX S. JANIS
INVENTOR.
BY Adrian L. Bateman, Jr.
ATTORNEY Patented Apr. 27, 1954

2,676,920

UNITED STATES PATENT OFFICE 2,676,920

ROTARY SCUM SKIMMER

Alex S. Janis, Milwaukee, Wis., assignor to Chain Belt Company, Milwaukee, Wis., a corporation of Wisconsin Application May 4, 1950, Serial No. 159,953

1 Claim. (Cl. 210—3)

This invention relates generally to the separation of solids from liquids and more particularly to the removal of floatable solids or scum from the surface of a separation tank.

In sewage treatment plants one or more sedimentation tanks are customarily employed for the purpose of allowing solids, both settleable and floatable, to separate from the contaminated liquid. This sedimentation process is continuous and in order to prevent the accumulation of solids in the tank, a commonly employed system utilizes a flight conveyer having a lower run in which the flights scrape along the bottom of the tank and move settleable solids into a sump at one end of the tank where they are pumped out. On the upper run of the conveyer the flights project above the surface of the liquid and in traversing the liquid surface lengthwise of the tank carry surface scum or floatable solids to the opposite end of the tank where they are accumulated, still floating on the liquid surface.

Several systems for removing this accumulated scum have been employed, most of which are rather complicated and expensive to install and maintain. Perhaps the most common inexpensive system is the type utilizing a pivoted trough open at the top. This type of skimmer is normally placed across the end of the sedimentation tank in the zone where the scum is accumulated and is located at an elevation where its open top is above the water surface. In order to operate it, the operator tilts the trough by means of a handle affixed to it until its lowermost lip is just below the water surface. In this position water flows into the trough carrying with it the scum floating on its surface.

It is readily apparent that this system of scum removal has inherent disadvantages in that it is not automatic in operation and also some water must be removed with the scum. Further, skill is necessary on the part of the operator in order to achieve scum removal with the tilting trough without so agitating the liquid surface as to cause remixing of some of the scum with the water in the tank.

Accordingly, the principal object of this invention is to provide a means for removing accumulated scum from a liquid surface automatically and without removing an appreciable amount of the separated liquid and without agitating the surface of the water so that remixing occurs with the water remaining in the tank.

A further object of this invention is to provide means for automatically cleaning the scum skimmer so that it does not become contaminated with scum after reasonable periods of operation.

A still further object of this invention is to perform the above mentioned objects in a simple apparatus requiring a minimum of maintenance and being inexpensive to install, operate and maintain.

According to this invention the scum skimmer is located transversely of the sedimentation tank and at one end thereof. Scum is accumulated in said end of the tank by means of an endless conveyer having flights which on their upper run project slightly above the surface of the liquid in the tank. The skimmer comprises one or more scraper blades rotatable about a shaft arranged transversely of the tank at the end of the tank in which scum is accumulated and at a horizontal elevation above the surface of the liquid. The blades are rotated about the shaft as an axis by mean of a motor and chain drive. As the blades rotate, their lowermost edges dip beneath the surface of the liquid and, pushing scum ahead of them, continue up an incline which communicates at its top with a trough adapted to receive and carry away the scum. Rubber inserts are provided in the edges of the scraper blades so that these edges might conform strictly to the contour of the incline and thereby prevent any scum from sliding beneath the blade and back into the sedimentation tank.

A further feature of the invention is the provision of a scraper blade wiper pivotally suspended above the scum trough in such a manner as to automatically wipe off each succeeding blade as it passes above the trough. In this manner an accumulation of scum on the skimmer blades is prevented.

Further objects and advantages of the invention will be apparent from the description which follows and from an examination of the drawings, in which:

Fig. 1 is a side elevation of a sedimentation tank with its side wall removed so that the relative positions of the collector conveyer, scum skimmer and its associated scraper blade wiper may be seen;

Fig. 2 is an enlarged view of the scum skimmer, scum trough and blade wiper showing these elements in greater detail;

Fig. 3 is an end view of the tank shown in Fig. 1 taken from the end in which the scum skimmer is located, with portions broken away to facilitate illustration;

Fig. 4 is a fragmentary perspective view of the tip portion of the skimmer blade showing the flexible blade insert; and Fig. 5 is a fragmentary side view of a portion of the scum trough, the end view of which is shown in Fig. 2, and illustrates the adjustable feature of the scum trough lip.

Referring to the details of the drawings, sedimentation of the contaminated liquid or sewage takes place in a tank indicated generally as 11. Sewage enters from the left in Fig. 1 through a conduit 12 and an influent trough 13 and is passed under a baffle 14 into the tank 11 which is rectangular in shape, having its side and end walls oppositel disposed. The baffle 14 is constructed so that its top is slightly below the water surface whereby very light solids and froth may pass over the baffle and will not accumulate in the tank adjacent the influent trough 13.

The tank is designed so that considering the rate of flow through the tank, the liquid is retained within the tank for a time sufficient to permit heavy, settleable solids to settle to the bottom of the tank and light, floatable solids to rise to the top of the tank and float upon the liquid surface as a scum blanket. An endless conveyer, powered by a motor 15 and chain drive 16 and comprising chains 17 and transverse flights 18 is articulated over sprockets 19 arranged to define a lower run in which the flights scrape along the bottom of the tank from right to left (Fig. 1) and an upper run in which the flights traverse the liquid surface from left to right (Fig. 1), with each flight 18 projecting above and below the liquid surface.

Flights traversing the bottom of the tank on the lower run of the conveyer scrape settleable solids from the tank bottom as at 20 and deposit said solids in a sludge hopper 21 at the influent end of the tank, where they may be drawn off by a sludge pump or by other means well known in the art. Similarly, flights traversing the liquid surface on the upper run of the conveyer accumulate floatable solids or scum in a scum zone 22 adjacent the effluent or right hand end of the tank in Fig. 1.

Clarified liquid leaves the tank by passing under a scum trough 23 and over an effluent weir 24 into an effluent trough 25, from which it may be passed to further treating stations or discharged. Scum accumulated in the scum zone 22 in the manner previously described is retained against discharge with the effluent by means of the forward side 26 of the scum trough 23 which acts as a baffle to retain the scum.

Removal of the scum accumulated in the scum zone 22 is effected by a rotary scum skimmer, best illustrated in Figs. 2 and 3.

Affixed to the side walls of the tank 11 are bearings 27 in which is rotatably journalled a shaft 28 having its axis parallel to the scum trough at an elevation above the liquid level in the tank and located transversely of the tank in a position in which it overlies the approximate midpoint of the scum zone 22. The shaft is rotated by means of a motor 29 through a chain 30 and a sprocket 31 keyed to one end of the shaft 28. Extending radially from the shaft and rigidly affixed thereto are sets of aligned arms 32, each set of which carries at its outer extremity a scraper blade 33 arranged parallel to the axis of the shaft 28.

As illustrated in Figs. 2 and 3 for the purpose of disclosure, there are two such sets of arms carried by the shaft with the blades arranged 180° apart, but this number may be varied from one to more than two within the scope of this invention.

The forward side 26 of the scum trough 23 is fitted at its top with a vertically adjustable cap 34, the topmost portion 35 of which forms a lip for the scum trough, the height of which may be adjusted by means of studs 36 embedded in the concrete of the trough, cooperating with the vertical slots 36' in a depending portion of the cap (see Fig. 5). Communicating with the lip 35 of the scum trough is an inclined plate 37 which extends downwardly from the trough lip to a point below the surface of the liquid in the tank and is of a transverse length substantially equal to the width of the tank 11. This inclined plate 37 has an arcuate cross section conforming substantially to the circumference of the circle described by the outward edge of the scraper blades 33 as they rotate. The lower portion of the plate 37 contains the slots 36' previously described.

As best illustrated in Fig. 4, the scraper blades 33 are fabricated with a resilient, flexible insert 38 projecting outwardly from the outside edge of the scraper blade and thereby providing a flexible edge for the scraper that may conform strictly to the contour of the inclined plate 37. The insert 38 extends for the length of the skimmer and is disposed between the plate 43 and the angle iron 44, as shown in Fig. 4. Plate 43 is mounted by means of bolts 45 on the bar 46, the plate having sufficient rigidity to enable it to pinch the resilient insert 38 when forced against it and to thereby retain said insert in a fixed position. A series of radial slots 47 in the insert 38 permit the insert to be adjusted to different positions upon loosening of the bolts 48 which extend through the slots 47, the plate 43 and the angle iron 44 to retain said insert as aforesaid.

In operation the scraper blades 33, as they rotate successively through the scum zone 22, force the accumulated scum up the incline 37 and over the scum trough lip 35 where it falls into the scum trough 23. The resilient edges of the scraper blades permit exact conformity with the contour of the inclined plate and also form a sufficient seal with said plate to prevent scum from escaping beneath the edge of the scraper blade. The seal formed between the scraper blade and the inclined trough is not water tight, however, and water that might be carried onto the incline by the skimmer is permitted to drain beneath the scraper blade and return to the tank, whereby the scum deposited in the scum trough is substantially dewatered.

To prevent an accumulation of scum on the scraper blades the blade wiper mechanism, best illustrated in Figs. 2 and 3, is provided. It comprises a horizontal shaft 39 supported transversely of the tank above the scum trough to which are pivotally secured V-shaped arms 40 carrying at their outer extremities a blade 41. The V configuration of the arms 40 and their pivotal connection to the shaft 39 causes the blade wiper mechanism to be normally suspended in the full line position of Fig. 2, and under propulsion by an advancing skimmer blade 33 to traverse that blade from its innermost edge to its outermost edge, in which last mentioned position the blade wiper mechanism occupies the dotted line position of Fig. 2. In traversing the scum skimmer blade 33 as aforesaid, the wiper blade 41 effectively removes accumulated scum adhering to the skimmer blade and drops it in the scum trough 23. When a skimmer blade has been cleaned, it continues upward on its radius of revolution and after it has passed beyond the wiper blade 41, said last mentioned blade pivots back into its initial position as shown in full lines in Fig. 2, ready to clean subsequent skimmer blades. A resilient, flexible insert 42 similar to the insert previously described in connection with the skimmer blade 33, is provided in the working edge of the wiper blade 41 in order to insure better contact and scraping action with the skimmer blade. A construction similar to that previously described in connection with the skimmer blade insert 38 is employed for the wiper blade insert 42 so that it may be adjusted radially to contact the scraper blade 33 throughout its entire length.

From the foregoing description it is apparent that this apparatus provides an efficient, automatic and inexpensive means of great capacity for removing floatable scum from the surface of a sedimentation tank. While, for purposes of disclosure, the apparatus has been described in connection wtih sewage treatment, it is equally adaptable for use in any vessel for removing floatable matter and it is intended that the scope of the invention should be limited only by the clear import of the following claim.

I claim:

In a tank for separating solids from liquids, means for removing floatable scum from the liquid surface comprising; a scum trough, said trough having a lip above the liquid level of the tank over which the scum may be discharged into the trough; an inclined plate communicating adjacent its lower end with the liquid surface and adjacent its upper end with the scum trough; a shaft adjacent and substantially parallel to said inclined plate; a scraper blade parallel to said shaft and affixed thereto in spaced relationship by arms extending from the shaft whereby said scraping blade is rotatable in a circular path about the shaft, the plane of the scraper blade faces remaining radial during such rotation, said scraper blade being operable to traverse said inclined plate upwardly toward the scum trough lip whereby scum is removed from the liquid surface, passed over the inclined plate and discharged into the scum trough; and means for removing adhering scum from the scraper blade comprising a wiping blade affixed to one end of a pair of arms and arranged to be suspended parallel to the scraper blade in intersecting relationship to the circular path of rotation, the other end of said arms being pivotally secured to mounting means whereby the wiping blade contacts the scraping blade after each traversal of the inclined plate and is caused by the advancing scraper blade to move radially outward along the leading face of said scraper blade thereby removing adhering scum from the scraper blade and dropping it into the trough.

References Cited in the file of this patent

UNITED STATES PATENTS

| Number | Name | Date |
| --- | --- | --- |
| 1,224,213 | Rosenthal | May 1, 1917 |
| 2,135,442 | Steindorf et al. | Nov. 1, 1938 |
| 2,137,421 | Tark | Nov. 22, 1938 |
| 2,237,172 | Briggs | Apr. 1, 1941 |
| 2,451,144 | Aubrey | Oct. 12, 1948 |

FOREIGN PATENTS

| Number | Country | Date |
| --- | --- | --- |
| 224,627 | Germany | July 26, 1910 |